United States Patent Office.

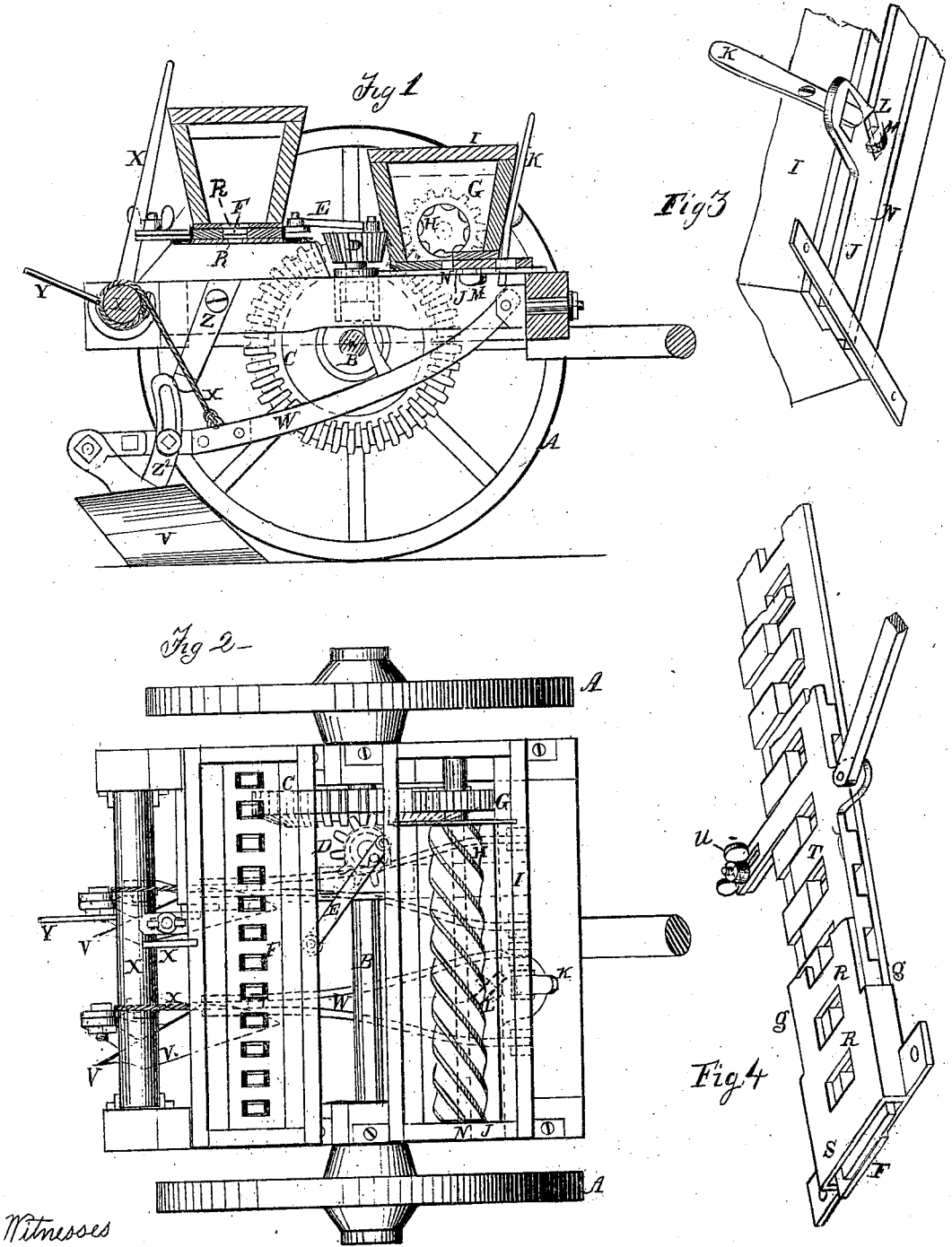

H. C. EVES, OF ORANGEVILLE, PENNSYLVANIA.

Letters Patent No. 93,290, dated August 3, 1869.

IMPROVEMENT IN SEED-PLANTER, FERTILIZER, AND PLOW COMBINED.

The Schedule referred to in these Letters Patent and making part of the same.

*To all whom it may concern:*

Be it known that I, H. C. EVES, of Orangeville, county of Columbia, and State of Pennsylvania, have invented an Improved Seed-Planter, Fertilizer, and Plow Combined; and I do hereby declare the following to be an exact description thereof, reference being had to the accompanying drawings, and to the letters of reference marked thereon, making a part of this specification, in which—

Figure 1 represents a sectional elevation of the machine.

Figure 2, a top view of the same.

Figure 3 shows the fertilizing-slide.

Figure 4, a perspective view of the seeding-slide.

The nature of my invention consists in the construction, combination, and operation of the seeding-slide, screw fertilizer, and adjustable plow.

A represents the carriage-wheels.

B, the axle.

C, the main toothed and bevel-wheel on the axle that drives the bevel-wheel D, that is attached to the pitman E, that operates the seeding-slide F.

The main wheel C also gears into the vertical toothed wheel G, on the end of the fertilizing screw-conveyer H, that revolves inside of the hopper I.

The one-half of the bottom of hopper I is permanent and stationary, the other half, J, is adjustable, by means of the upright lever K and the oblique slot L, with its bolt M, upon which the slide J is moved sufficiently to open and close the bottom of the hopper at the centre at N, through which the fertilizing substance or material falls to the ground, and by which opening N the quantity is regulated, the screw-conveyer H continually moving the fertilizing-material through the opening N beneath.

The seeding-slide F is an adjustable slide, operating from side to side between double plates Q, with square apertures R above and below, through which the grain is discharged evenly upon the ground from the hopper with a shuttle-feed.

The upper and lower plates Q have boxed ends S, in which the slide F moves and is accurately guided.

The slide F is divided through its whole length, and its apertures T are square, and are enlarged or diminished, to regulate the quantity of grain to be sown, by the set-screw U, that is shifted back or forward, to set the apertures to the proper size required.

V are plows, (attached to drag-bars W, fastened to the front cross-piece of the frame,) intended to plow in the grain, and reverse all the ground as the plows pass along.

The plows V are also adjustable, by the windlass X, to raise and lower them when required, and when raised, they are held up by the projecting arm Y catching into the notched spring Z.

The upright slotted arm $Z^2$ operates on a bolt at the side of the drag-bar W, so as to allow the plow to yield, in case it comes in contact with anything solid.

What I claim as my invention, and desire to secure by Letters Patent, is—

The double seeding-slide, screw fertilizer, and adjustable plow, when constructed, combined, and operating as herein described, and for the purposes set forth.

H. C. EVES.

Witnesses:
D. H. MIGARGED,
J. B. HANNAN.